United States Patent
Toh et al.

(10) Patent No.: US 12,210,883 B1
(45) Date of Patent: Jan. 28, 2025

(54) ACCELERATING WINDOWS FAST STARTUP FOR DRAM-LESS SSD

(71) Applicant: Dell Products L.P., Round Rock, TX (US)

(72) Inventors: Ghim Teck Toh, Singapore (SG); Min Thu Aung, Singapore (SG); Young Hwan Jang, Gyeonggi-do (KR)

(73) Assignee: Dell Products L.P., Round Rock, TX (US)

( * ) Notice: Subject to any disclaimer, the term of this patent is extended or adjusted under 35 U.S.C. 154(b) by 61 days.

(21) Appl. No.: 18/359,520

(22) Filed: Jul. 26, 2023

(51) Int. Cl.
*G06F 9/4401* (2018.01)
*G06F 12/1045* (2016.01)

(52) U.S. Cl.
CPC ........ *G06F 9/4418* (2013.01); *G06F 12/1054* (2013.01); *G06F 2212/608* (2013.01)

(58) Field of Classification Search
CPC .............. G06F 9/4418; G06F 12/1054; G06F 2212/608
See application file for complete search history.

(56) References Cited

U.S. PATENT DOCUMENTS

| | | | | |
|---|---|---|---|---|
| 8,671,241 | B2 * | 3/2014 | Molloy | G06F 12/0246 711/E12.008 |
| 2013/0290760 | A1 * | 10/2013 | Cooper | G06F 1/32 713/323 |
| 2014/0164675 | A1 * | 6/2014 | Ehrlich | G06F 3/0659 711/103 |

* cited by examiner

*Primary Examiner* — Terrell S Johnson
(74) *Attorney, Agent, or Firm* — Womble Bond Dickinson (US) LLP

(57) ABSTRACT

Methods, systems, and devices for providing computer implemented services are disclosed. To provide the computer implemented services while managing limited hardware resources necessary to provide the services, a hibernation may be performed. To do so, a hibernation manager may facilitate management and storage of hibernation data for use during hibernation and startup of a system. To manage and store the hibernation data, the hibernation manager may identify an allocation of high-performance storage for the hibernation data, obtain a compression pipeline based on the allocation, and stream the hibernation data through the compression pipeline. By doing so, the speed in which the hibernation data is written and read may be increased. Thus, hibernation and startup of the system may be enhanced.

20 Claims, 5 Drawing Sheets

ACCELERATING WINDOWS FAST STARTUP FOR DRAM-LESS SSD

FIELD

Embodiments disclosed herein relate generally to device management. More particularly, embodiments disclosed herein relate to systems and methods for data management using limited hardware resources.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
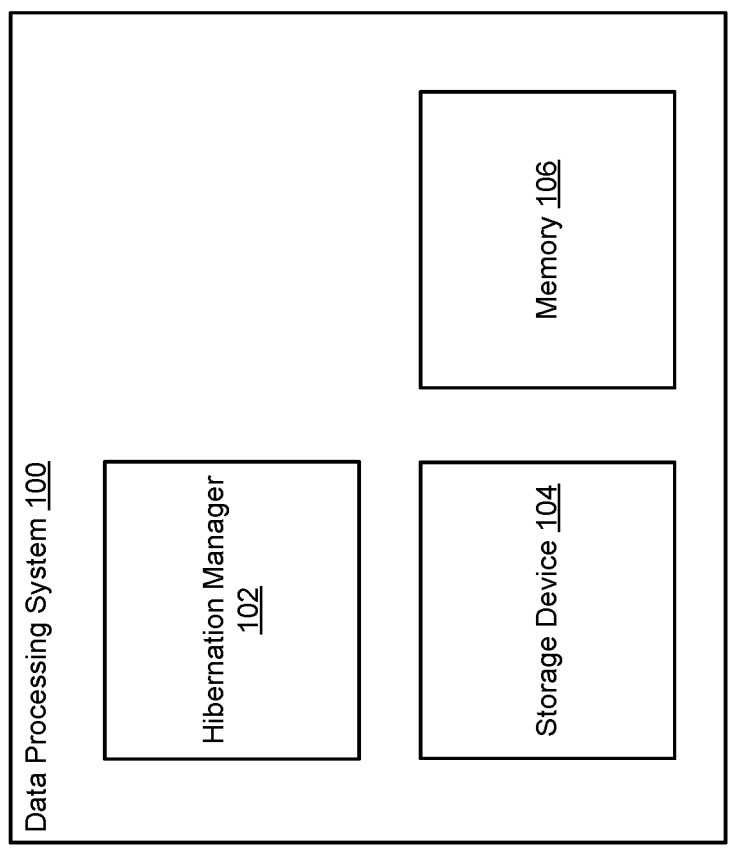
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for providing, at least in part, computer-implemented services. To provide the services, a system may include any number of hardware components (e.g., storage devices, memory modules, processors, etc.). However, to provide their functionalities, the hardware components may consume power.

To manage (e.g., limit) the consumption of power, a hibernation procedure may be performed. To perform the hibernation procedure, the system may reduce power routed to the various hardware components (thereby limiting power consumed) while managing and storing data regarding the system's state of operation when the hibernation procedure is initiated.

To perform the hibernation procedure, power that is routed to the hardware components (e.g., consumed by the hardware components to provide their functionalities) may be reduced until each of the hardware components powers off. Furthermore, and in tandem with the reduction of power, data regarding a state of operation of the system may be obtained as hibernation data along with a look up table for managing physical to logical address mapping. The hibernation data may be streamed through a compression pipeline before being stored in an allocated portion of high-performance storage for future use. The look up table may be updated based on the storage of the hibernation data.

By storing the hibernation data in the allocated portion of the high-performance storage, storage of hibernation data may be completed more quickly through reduced swapping of data to memory onboard a storage device. Accordingly, a data processing system may have improved uptime and reduce inconvenience for users during performance of hibernation procedures that may at least temporarily limit use of the data processing system by the users.

In an embodiment, a method is provided for storing hibernation data for a data processing system using a storage device that uses memory of the data processing system to manage a look up table (LUT).

The method may include identifying that a hibernation procedure for the data processing system has been initiated, the hibernation procedure ejecting the LUT from the memory and requiring that the storage device selectively cache portions of the LUT in local memory of the storage device for continued operation of the storage device during the hibernation procedure, and the LUT being of a larger size than the local memory; based on the identification: identifying a portion of high-performance storage space of the storage device for storage of the hibernation data used in the hibernation procedure; obtaining a compression pipeline for the hibernation data prior to storing the hibernation data in the high-performance storage to stream compressed hibernation data to the storage device for storage; storing the compressed hibernation data in the portion of the high-performance storage space using the compression pipeline; and initiating an update for a portion of the LUT cached in the local memory based on: logical block addresses assigned to the hibernation data by the data processing system, and physical addresses assigned to the hibernation data by a controller of the storage device.

The storage device may include single level cell storage in which each cell stores a single bit of digital data, the single level cell storage hosting the high-performance storage space; and quad level cell storage in which each cell stores four bits of digital data.

The portion may be in a physical continuous address range of the high-performance storage space, and the physical continuous address range being defined with a starting physical address and an ending physical address.

Identifying the portion of the high-performance storage space may include: making an identification that a pre-allocation for the portion was established prior to initiation of the hibernation procedure.

Identifying the portion of the high-performance storage space may include: requesting that the storage device allocate some of the high-performance storage space for storage of the hibernation data.

The portion of high-performance storage space may be based on 40% of dram, and then reduced by an expected compression ratio of 25:1, and then expanded by a factor of 3 for safety.

The portion of high-performance storage space may be based on: a presumed size of the hibernation data, the presumed size of the hibernation data being based on a fraction of the memory of the data processing system; a presumed compression ratio for the hibernation data; and a factor of safety for the presumed compression ratio.

The fraction of the memory of the data processing system may be between 3/10 and 5/10 of the memory of the data processing system.

The presumed compression ratio may be between 1/10 and 1/25.

The factor of safety may be between 2 and 4.

Obtaining the compression pipeline may include: identifying a hardware compressor available to compress the hibernation data; reserving use of the hardware compressor; establishing an input-output flow to direct the hibernation data to the hardware compressor while the hardware compressor is reserved; establishing a second input-output flow from the hardware compressor to the storage device while the hardware compressor is reserved; and streaming the hibernation data using the input-output flow and the second input-output flow to provide compressed hibernation data to the storage device.

In an embodiment, a non-transitory media is provided that may include instructions that when executed by a processor cause the computer-implemented method to be performed.

In an embodiment, a data processing system is provided that may include the non-transitory media and a processor and may perform the computer-implemented method when the computer instructions are executed by the processor.

Turning to FIG. 1, a block diagram illustrating a system in accordance with an embodiment is shown. The system shown in FIG. 1 may provide computer implemented services. The computer implemented services may include any type and/or quantity of computer implemented services. For example, the computer implemented services may include data storage services, instant messaging services, database services, and/or any other type of service that may be implemented with a computing device.

To provide the computer implemented services, various hardware components may be used. These hardware components may facilitate various functionalities of a data processing system (e.g., 100). For example, data processing system 100 may include processors, random access memory (RAM) (e.g., 106), storage devices (e.g., 104), etc. The hardware devices may support execution of various software entities (e.g., applications) that provide all, or a portion of the computer implemented services.

When providing their functionalities, the software entities may utilize data storage services provided by storage device 104. The storage services may include storing data and providing copies of stored data.

To provide the storage services, storage device 104 may include persistent storage. The persistent storage may be implemented using various media such as solid-state media.

When data is stored in the solid-state media, the storage device may do so in a manner that extends the life of the solid-state media. For example, storage device 104 may implement wear leveling and/or other algorithmic approaches to manage wear on the solid-state media to provide the data storage services.

To implement the wear leveling, storage device 104 may utilize various lookup tables that define where portions of files or other aggregations of data are stored in the solid-state media. The tables may be updated over time as locations of portions of stored data change over time.

The tables may not be negligible in size and storage device 104 may lack sufficient memory to store entire tables. Consequently, storage device 104 may utilize some of memory 106 to store the tables.

During operation, the hardware components of data processing system 100 may consume power when providing their functionalities. To manage (e.g., limit) the consumption of power and/or for other purposes, a hibernation procedure may be performed. By performing the hibernation procedure, the data processing system may power down (e.g., place in low power/no power usage states) various hardware components (thereby limiting power consumed) while retaining a state of operation. For example, any documents and/or programs open and/or running when the hibernation procedure is initiated may be resumed when the data processing system powers on to end hibernation.

To perform the hibernation procedure, data regarding the state of operation may be obtained from host memory (e.g., dynamic random-access memory (DRAM), 106) of the data processing system, and then be saved to persistent storage (discussed with regard to FIG. 2) as hibernation data.

To store the hibernation data into persistent storage, a storage device may be used to provide the persistent storage. However, when the hibernation procedure is initiated, the host system may deny use of the host memory to the storage device. Consequently, during the hibernation procedure, the ability of the storage device to store data may be greatly curtailed. For example, the storage device may only be able to use the limited amount of onboard memory to which it has access. This amount of memory may be insufficient to efficiently use the tables (e.g., lookup table (LUT)) required to be used in providing data storage services. Accordingly, the duration of time required to store data may be greatly increased due to the storage device being required to swap portions of the table into out and of memory as data is stored.

For example, to access stored data and/or store new data, the LUT may relate a physical address of particular data in the persistent storage with a logical address of the particular data in a file management system hosted by the data processing system (e.g., physical to logical addressing). Therefore, the LUT may be used to search for and locate particular data such as the hibernation data based on physical addresses and/or logical addresses associated with the hibernation data. Without access to the LUT, the hibernation data may be unascertainable.

Consequently, during the hibernation procedure, the host memory may become unavailable to the storage device (and/or other components of the data processing system) as power is conserved. For example, as various hardware components of the data processing system are powered down, power may be cut off from the host memory. Therefore, without power, the host memory may be unable to continue storing the data regarding the state of operation and/or the LUT.

Thus, the hibernation procedure may be impacted by a loss of access to the host memory. For example, when the host memory becomes unavailable, the storage device may only have access to a limited amount of temporary storage (e.g., static random-access memory (SRAM)) of the storage device (e.g., local memory of the storage device versus host memory of the data processing system). Accordingly, the limited amount of temporary storage may limit the speed in which the hibernation data can be written to persistent storage.

For example, how fast the hibernation data is written into persistent storage, and how fast the hibernation data is read back from persistent storage and/or temporary storage, may determine an efficiency level of (i) the hibernation procedure and/or (ii) a startup that ends the hibernation. Thus, the limited speed caused by a lack of access to the host memory throughout the hibernation procedure may lower the efficiency level of the hibernation procedure (and/or the startup by increase an amount of time for the hibernation data to be written to and/or read from storage.

In general, embodiments disclosed herein may provide methods, systems, and/or devices for storing hibernation data for a data processing system using a storage device that uses memory (e.g., the host memory) of the data processing system to manage a LUT. To do so, a hibernation manager may be used. The hibernation manager (e.g., 102) may (i) identify that a hibernation procedure has been initiated, (ii) identify a portion of high-performance storage (discussed further below) of the storage device allocated for storage of the hibernation data, (iii) obtain a compression pipeline for the hibernation data prior to being stored in the allocated portion of the high-performance storage, (iv) store the (compressed) hibernation data in the portion of the high-performance storage, and (v) initiate update of a portion of the LUT cached in the local memory (e.g., the SRAM) of the storage device.

To update the LUT and/or portions of the LUT, physical addresses and/or logical addresses associated with particular data may be modified to reflect the storage of, for example, the hibernation data in the high performance storage. By selectively allocating the high performance storage, the LUT may only need to be updated in a limited manner (in contrast to general data storage which may require updating large and disparate portions of the LUT). Consequently, only a small portion of the LUT may need to be loaded into memory, and which may be within the limitations of the onboard memory of the storage device. Accordingly, the update of the portion of the LUT may be based on (i) logical block addresses assigned to the hibernation data by the data processing system, and/or (ii) physical addresses assigned to the hibernation data by a controller of the storage device, which may be intentionally selected to be limited in scope thereby necessitating only limited updates to the LUT. Thus, by updating (at least the portion of) the LUT, the hibernation data may be ascertained by using the LUT to indicate where the hibernation data is stored.

Figure 2:
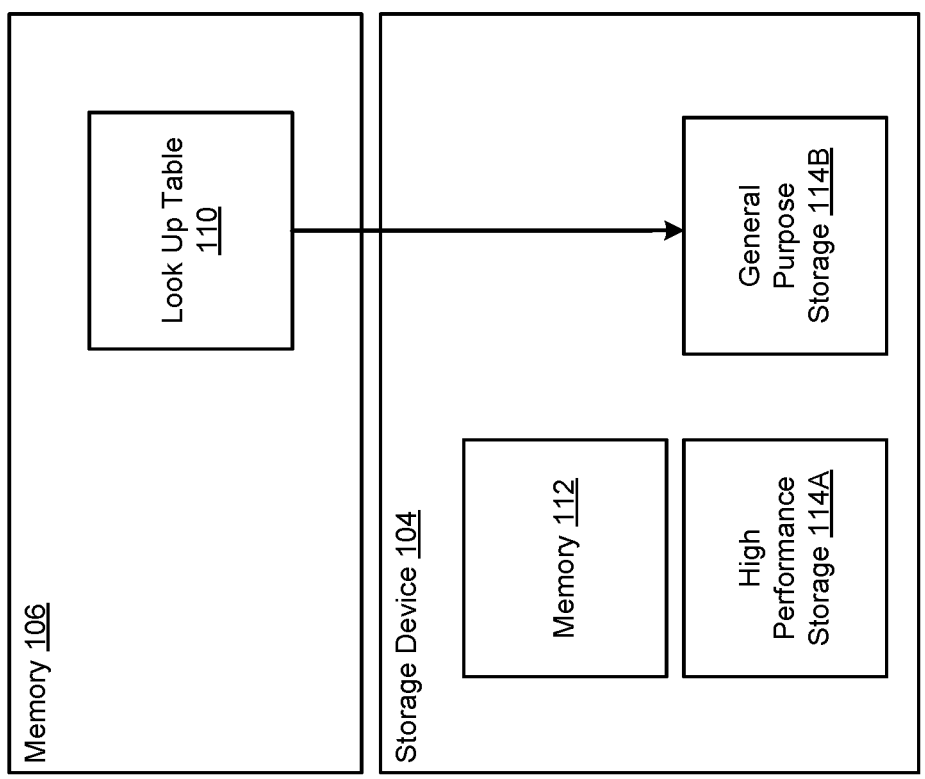
FIG. 2 shows a block diagram illustrating a storage device and memory in accordance with an embodiment.

Furthermore, by storing the compressed hibernation data in the high-performance storage, the compressed hibernation data may be written to persistent storage and/or read from persistent storage at a faster rate when compared to writing and/or reading hibernation data using limited local memory (e.g., SRAM) to store the hibernation data to general purpose storage of the storage device (refer to FIG. 2 for additional information regarding the high-performance storage, the general purpose storage, and usage of the local memory).

Accordingly, systems in accordance with embodiments disclosed herein may facilitate storage of hibernation data more quickly than would be possible using general data storage processes, and thus, the efficiency level (discussed previously) of completion of the hibernation procedure, and/or the startup that ends the hibernation, may be improved.

Figure 3:
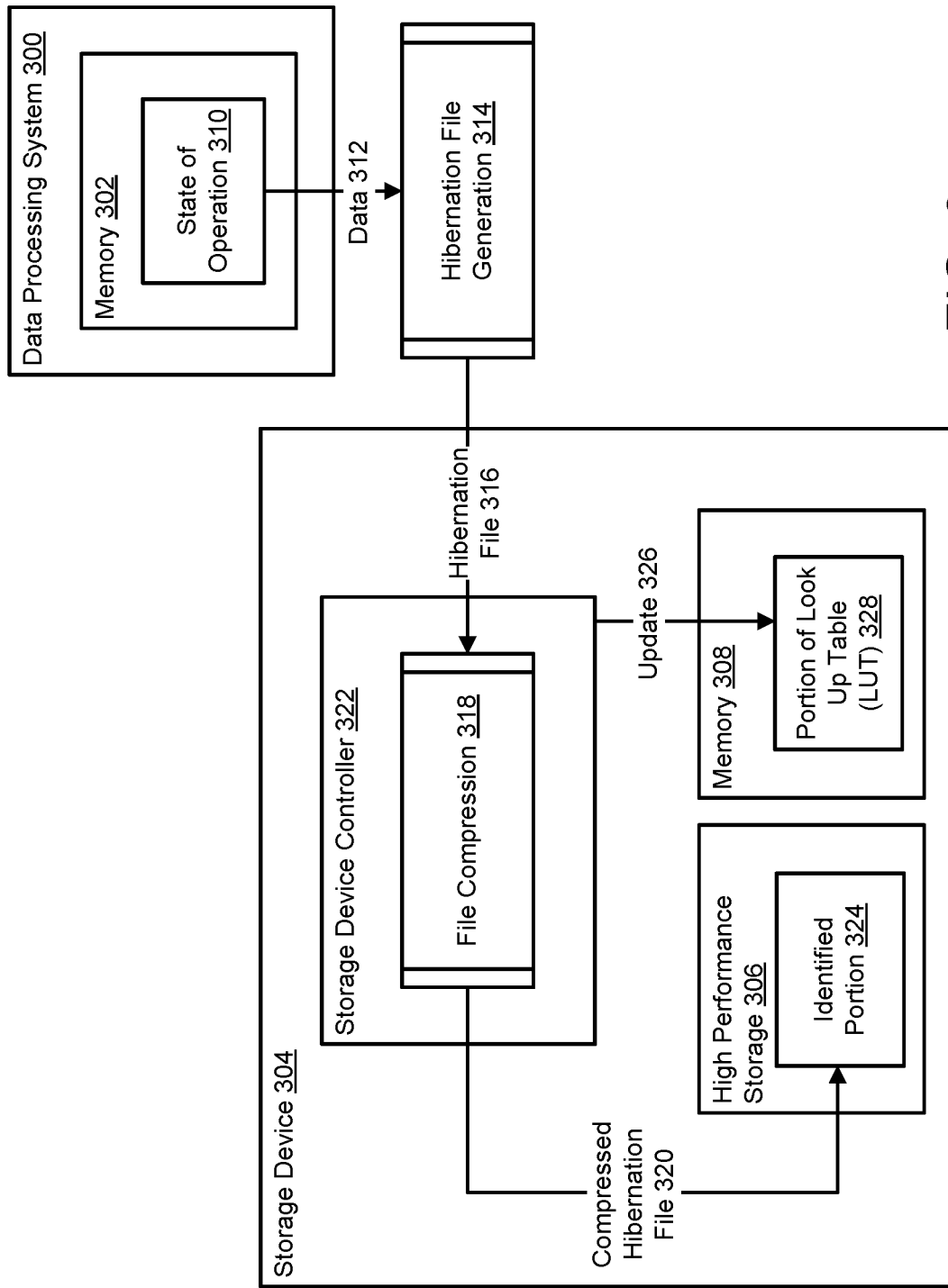
FIG. 3 shows a data flow diagram showing management of data in accordance with an embodiment.
Figure 4:
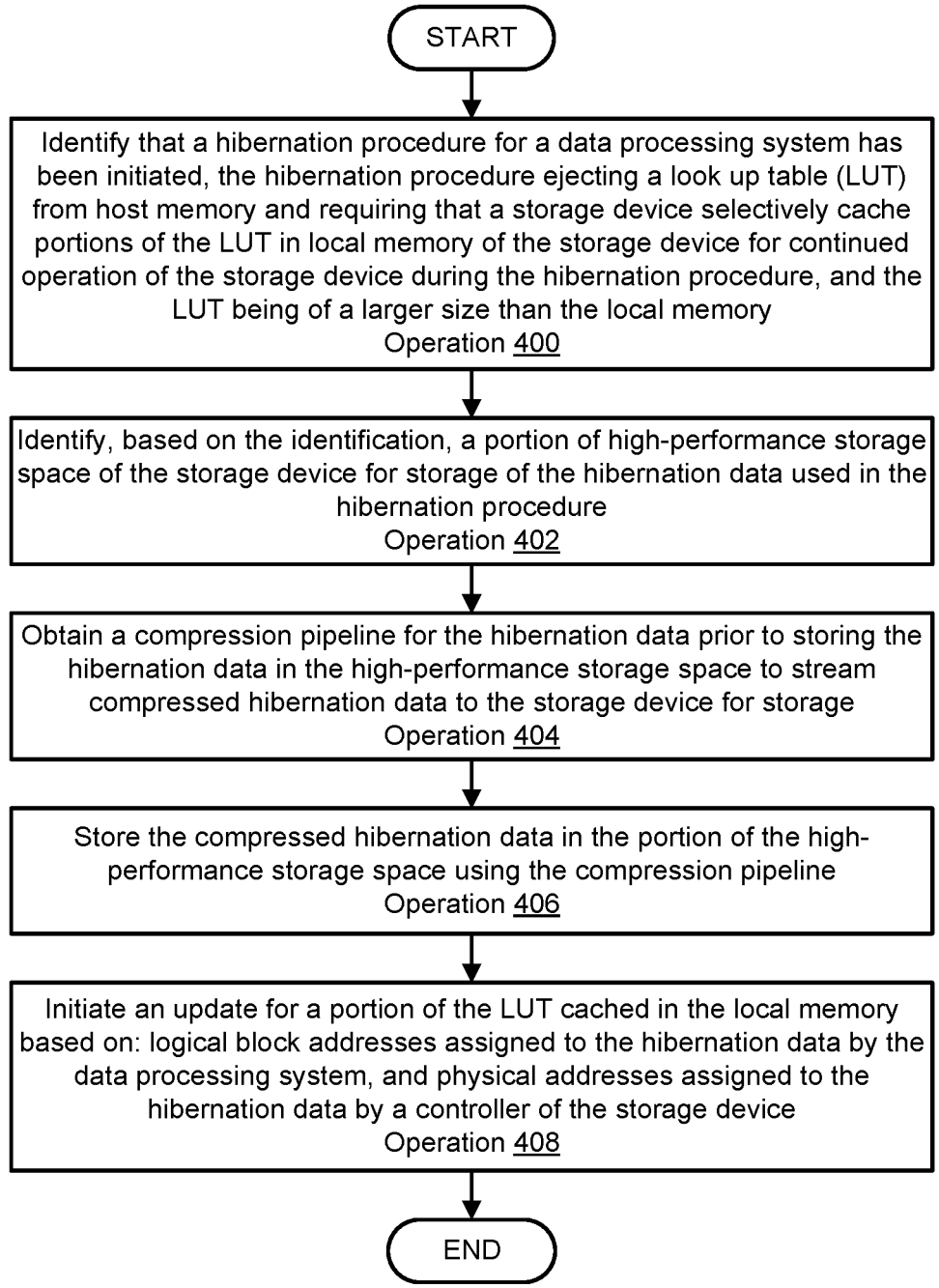
FIG. 4 shows a flow diagram illustrating a method for storing hibernation data in accordance with an embodiment.

When performing their functionality, hibernation manager 102, storage device 104, and/or memory 106 may perform all, or a portion, of the methods and/or actions described in FIGS. 2-4.

Data processing system 100 may be implemented using one or more computing devices such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices and various hardware components of the computing devices, refer to FIG. 5.

While illustrated in FIG. 1 as including a limited number of specific components, a system in accordance with an embodiment may include fewer, additional, and/or different components than those illustrated therein.

To further clarify embodiments disclosed herein, a first data structure diagram in accordance with an embodiment is shown in FIG. 2. The first data structure diagram illustrates data structures stored in and/or used by storage device 104 and memory 106.

Turning to FIG. 2, the first data structure diagram illustrating storage device 104, memory 106, and look up table (LUT) 110 in accordance with an embodiment is shown. In FIG. 2, LUT 110 may be similar to the LUT discussed with regard to FIG. 1. For example, LUT 110 may be stored in memory 106 of a host data processing system and may be used by storage device 104 to record information regarding data stored in its storage resources and during the hibernation procedure.

As previously discussed, during the hibernation procedure, memory 106 may become unavailable due to the conservation of power caused by the hibernation procedure. Therefore, to provide LUT 110 to storage device 104 for the hibernation procedure, memory 106 may eject LUT 110 before becoming unavailable.

In FIG. 2, LUT 110 is illustrated with a black arrow leading to general purpose storage 114B (one of two types of the persistent storage, discussed further below) of storage device 104 to illustrate this transfer from memory 106 to general purpose storage 114B. This black arrow illustrates a flow of data (a movement of LUT 110) from memory 106 to storage device 104.

By storing LUT 110 in persistent storage, LUT 110 may be used by a controller of storage device 104 (not explicitly shown) to store new data (e.g., the hibernation data) by recording (e.g., by physical to logical addressing) where the new data may be stored, and/or other changes to data stored by storage device 104 on behalf of other entities. For example, LUT 110 may be modified to indicate physical addresses and/or logical addresses to reflect storage of the hibernation data obtained during the hibernation procedure. Furthermore, LUT 110 may be used to search for and locate particular data such as the hibernation data based on the physical addresses and/or the logical addresses indicated by the LUT.

As previously discussed, the hibernation data and/or the LUT may be stored in persistent storage. This persistent storage may be provided by storage device 104. To do so, storage device 104 may include high performance storage 114A and general purpose storage 114B. Each of which is discussed below.

High performance storage 114A may be implemented by NAND memory such as single level cell storage in which each cell stores a single bit of digital data. By providing the single level cell (SLC) storage, high performance storage 114A may provide a physical and continuous address range for storage of hibernation data (e.g., having a starting physical address and an ending physical address) rather than discrete (e.g., non-continuous) portions of physical address ranges. Consequently, when storing the hibernation data, only small portions of the LUT may need to be loaded into memory 112 to track the hibernation data. Accordingly, the process of storing the hibernation data may be more time efficient because swapping of various portions of LUT into and out of memory 112 may not be required.

General purpose storage 114B may be implemented by NAND memory such as quad level cell storage in which each cell stores four bits of digital data. By providing the quad level cell (QLC) storage, general purpose storage 114B may be adapted to store a large amount of data long-term (e.g., when compared to the single level cell storage). However, the quad level cell storage may not provide a physical continuous address, and instead may provide discrete portions of physical address ranges. In an embodiment, high performance storage 114A is dynamically instantiated by reconfiguring portions of general purpose storage 114B. For example, some of the NAND cells and corresponding logic implemented by a controller (not shown) of storage device 104 may use the NAND cells as high performance storage 114A.

By storing the hibernation data in high performance storage 114A, the physical continuous address provided may require, for example, a single portion of LUT 110 (e.g., associated with the hibernation data) to be used for storage of the hibernation data.

It will be appreciated that while described using quad level cell storage, general purpose storage 114B in accordance with an embodiment may include fewer, additional, and/or different level cell storages than those discussed herein.

In addition to providing the persistent storage, storage device 104 may include a limited amount of local memory (e.g., memory 112). During the hibernation procedure, memory 112 may be used to cache a portion (e.g., the single portion, mentioned above) of LUT 110. The portion may be used to track addressing for the hibernation data as it is stored in high performance storage 114A. By only needing to cache the portion rather than the full LUT, memory 112 (along with the controller of storage device 104) may be used to facilitate fast write and/or read times of the hibernation data to the persistent storage.

For example, if the hibernation data is stored in general purpose storage 114B, then the discreet address range would require memory 112 to cache each portion of LUT 110 relevant to the hibernation data as storage of the hibernation data is facilitated. However, the more than one portion of LUT 110 may be of a larger size than memory 112, requiring memory 112 to cache, for example, each of the portions in turn as the hibernation data is stored. Thus, storage of the hibernation data may be delayed due to swapping of various portions of LUT 110.

To provide its functionality, memory 112 may be implemented by, for example, static random-access memory (SRAM)).

Once the hibernation data is stored in high performance storage 114A, and the cached portion of LUT 110 is updated to reflect the storage, the controller may use memory 112 to initiate an update for LUT 110 stored in general purpose storage 114B. For additional information regarding the hibernation procedure, refer to FIG. 3 below.

While illustrated in FIG. 2 as including a limited number of specific components, a system in accordance with an embodiment may include fewer, additional, and/or different components than those illustrated therein.

To further clarify embodiments disclosed herein, a second data flow diagram in accordance with an embodiment is shown in FIG. 3. The second data flow diagram may illustrate how data is obtained and used within the system of FIG. 1.

Turning to FIG. 3, the second data flow diagram illustrating a data flow in accordance with an embodiment is shown. In FIG. 3, Data processing system (DPS) 300 may be similar to DPS 100 of FIG. 1, and storage device 304 may be similar to storage device 104 of FIG. 1. For example, in FIG. 3, storage device 304 may be one of the various hardware components included in DPS 300.

To perform the hibernation procedure, data regarding a state of operation (e.g., 310) of DPS 300 may be managed in a manner that results in hibernation data (obtained based on the data) being stored in persistent storage of storage device 304 for future use.

For example, assume that DPS 300 hosts a word processing program (referred to as "program A"). DPS 300 may provide computer implemented services by using program A and various documents (e.g., "documents A-C") generated and managed using program A. Data regarding these documents and/or copies of the documents themselves may be stored in memory 302 while the documents are being edited. The data may track, for example, the conditions of the documents, the state of the work processing program, etc.

Now assume a scenario in which the hibernation procedure is initiated for DPS 300 while program A is running and each of documents A-C is open. To place DPS 300 in condition for hibernation, data regarding program A and documents A-C(e.g., the data regarding state of operation 310) may be managed (e.g., identified in memory 302, and packaged as state of operation 310) and stored in persistent storage. By storing this data, DPS 300 may be sufficiently equipped for a fast startup process that results in continued use of program A and documents A-C as though a hibernation procedure had not taken place.

To manage the data regarding state of operation 310, memory 302 (e.g., the DRAM discussed with regard to FIGS. 1-2) may eject the data (e.g., 312) in preparation for a loss of power to memory 302 caused by the hibernation procedure. Alternatively, for example, if memory 302 were to not eject data 312, then state of operation 310 may be lost as memory 302 loses power and is unable to temporarily store state of operation 310. Thus DPS 300 may be prevented from continuing state of operation 310 once the hibernation is ended.

As part of storing state of operation 310 in persistent storage, a compression pipeline for data 312 (e.g., the ejected state of operation 310 data) may be obtained to place data 312 in condition for being stored in the persistent storage. This compression pipeline may include hibernation file generation 314 where the hibernation data is generated based on data 312. For example, metadata may be added, the data may be reorganized, etc. Once generated, hibernation file 316 may be provided to a controller (e.g., 322) of storage device 304.

Once provided to storage device controller 322, hibernation file 316 (the hibernation data generated in a file format) may continue through the compression pipeline to file compression 318 where the hibernation data is compressed to a size as discussed with regard to FIGS. 1-2 to obtain compressed hibernation file 320. File compression 318 may be implemented using any hardware and/or software compression process. For example, file compression 318 may be performed by storage device controller 322 and/or other hardware components of the data processing system.

It will be appreciated that in some cases, hibernation file 316 may not be compressed to obtain compressed hibernation file 320. In such cases, hibernation file 316 may be stored instead of compressed hibernation file 320, as discussed below.

Once compressed, compressed hibernation file 320 (a compressed file generated based on hibernation file 316) may be stored in identified portion 324 of storage device 304, as discussed further below.

As previously discussed, a portion (e.g., 324) of high-performance storage space (e.g., 306) may be identified for storage of the hibernation data. This identification may be performed by (i) making an identification that a pre-allocation for identified portion 324 was established prior to initiation of (and/or during) the hibernation procedure, or (ii) requesting that storage device 304 (e.g., the controller for storage device 304) allocates some of high performance storage 306 for storage of compressed hibernation file 320.

For example, in a scenario in which identified portion 324 of the storage resources of high performance storage 306 was not pre-allocated prior to initiation of the hibernation procedure, storage device controller 322 may allocate identified portion 324 of high performance storage 306 for storage of compressed hibernation file 320.

Once identified portion 324 is ready, compressed hibernation file 320 may be stored in identified portion 324.

In response to the allocation of space for (and/or the storage of) the hibernation data (compressed or uncompressed), storage device controller 322 may generate and write update 326. Update 326 may include information regarding a physical address and/or logical address that indicates where compressed hibernation file 320 has been stored (e.g., update 326 may be indicative of identified portion 324). Update 326 may be written to a portion of look up table (LUT) 328 (a portion of LUT 110 discussed with regard to FIGS. 1-2) stored in memory 308, where the portion of LUT 328 may be temporarily stored in memory 308 (e.g., the SRAM discussed with regard to FIGS. 1-2). The portion of LUT 328 may be loaded into memory at the request of storage device controller 322 as part of the data storage process.

It will be appreciated that before the entirety of DPS 300 is powered down (e.g., shut down/off), the portion of LUT 328 in memory may be used to update LUT 110 (stored in general purpose storage 114B of FIG. 2) to reflect the storage of the hibernation data. Consequently, when storage device 304 is depowered, the copy of LUT 110 stored in persistent storage of storage device 304 may reflect the actual location of hibernation data 320 stored in high performance storage 306.

By storing the hibernation data and updating these look up tables in this manner, startup and hibernation procedures may be performed more quickly. For example, a fast startup may be performed using the hibernation data stored in identified portion 324. The hibernation procedure may also be performed more quickly by reducing the time required to store the hibernation data in storage 304.

As discussed above, the components (depicted using data structures) of FIGS. 1-3 may perform various methods to provide data management services in a manner that reducing the time for performance of hibernation (and/or startup) procedures.

To further clarify embodiments disclosed herein, a flow diagram in accordance with an embodiment is shown in FIG. 4. This flow diagram shows a method of storing data for hibernation purposes. While described with respect to a hibernation procedure, it will be understood that embodiments disclosed herein are broadly applicable to different use cases (e.g., different data management cases) as well as different types of data processing systems than those described below.

In the flow diagram discussed below, any of the operations may be repeated, performed in different orders, omitted, and/or performed in parallel with or a partially overlapping in time manner with other operations.

Turning to FIG. 4, a flow diagram illustrating a method for storing hibernation data in accordance with an embodiment is shown. The method may be performed, for example, by a data processing system, a hibernation manager, a storage device, a controller of the storage device, memory, and/or other components illustrated in FIGS. 1-3.

At operation 400, initiation of a hibernation procedure is identified for a data processing system, the hibernation procedure ejecting a look up table (LUT) from host memory and requiring that a storage device selectively cache portions of the LUT in local memory of the storage device for continued operation of the storage device during the hibernation procedure, and the LUT being of a larger size than the local memory. The initiation may be identified by obtaining a notification indicating start of the hibernation procedure. For example, a processor of the data processing system may execute code when hibernation is instantiated by a user of the data processing system (e.g., by interacting with a graphical user interface (GUI) of the data processing system). When executed, this code may cause the notification to be sent to the hibernation manager, along with various data that may be used to perform the hibernation procedure.

At operation 402, based on the identification, a portion of high-performance storage space of the storage device is identified for storage of the hibernation data used in the hibernation procedure. The portion may be identified by (i) identifying a pre-allocation for the portion was established prior to initiation of the hibernation procedure, or (ii) requesting that the storage device allocate some of the high-performance storage space for storage of the hibernation data.

To identify the pre-allocation, at least a portion of the LUT may be used. For example, the pre-allocation may be identified by reading data from the LUT indicative of a physical address and/or logical address associated with the hibernation procedure.

To request that the storage device allocate some of the high-performance storage space, a controller of the storage device may be used. The controller may manage functionalities provided by the storage device such that the controller may have sufficient authority to allocate portions of storage space for storage of various data (e.g., hibernation data).

At operation 404, a compression pipeline is obtained for the hibernation data prior to storing the hibernation data in the high-performance storage space to stream compressed hibernation data to the storage device for storage. The compression pipeline may be obtained by (i) identifying a hardware compressor available to compress the hibernation data, (ii) reserving use of the hardware compressor, (iii)

establishing an input-output flow to direct the hibernation data to the hardware compressor while the hardware compressor is reserved, and (iv) establishing a second input-output flow from the hardware compressor to the storage device while the hardware compressor is reserved.

At operation 406, the compressed hibernation data is stored in the portion of the high-performance storage space using the compression pipeline. The compressed hibernation data may be stored by streaming the hibernation data using the input-output flow and the second input-output flow to provide compressed hibernation data to a controller of the storage device. The controller may then store the compressed hibernation data in the portion of high-performance storage.

At operation 408, an update is initiated for a portion of the LUT cached in the local memory based on (i) logical block addresses assigned to the hibernation data by the data processing system, and (ii) physical addresses assigned to the hibernation data by a controller of the storage device. The update may be initiated by modifying existing addresses in the LUT cached in local memory to reflect the storage of the hibernation data. The LUT cached in local memory may then be used to, for example, update the LUT stored in general purpose storage 114B.

The method may end following operation 408.

Using the method illustrated in FIG. 4, a system in accordance with an embodiment may improve the rate at which a hibernation (and/or startup) procedure may be performed. Consequently, when a hibernation procedure is performed the user of a data processing system may be less inconvenienced by the duration of the hibernation procedure.

Figure 5:
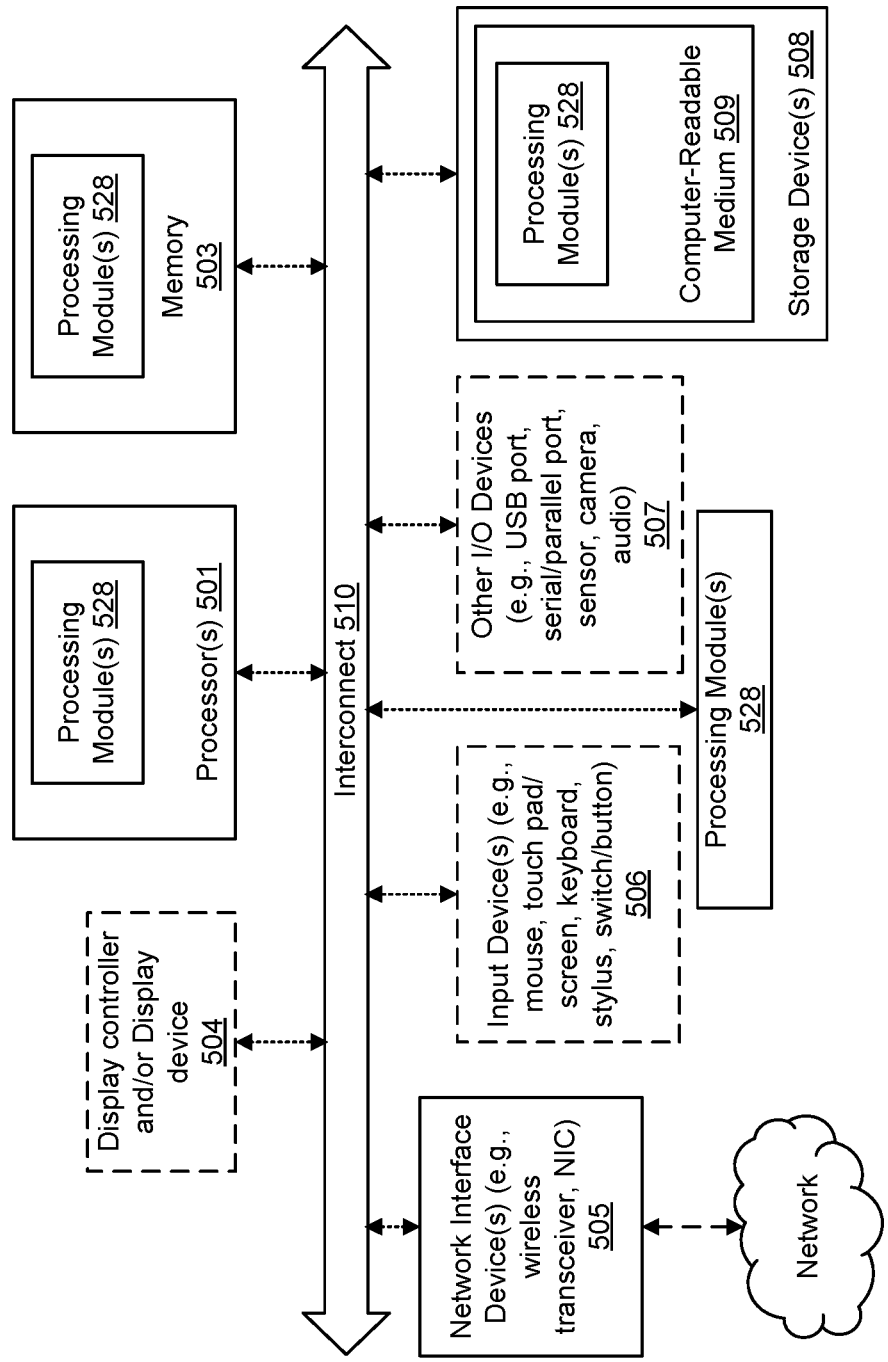
FIG. 5 shows a block diagram illustrating a data processing system in accordance with an embodiment.

Any of the components illustrated in FIGS. 1-3 may be implemented with one or more computing devices. Turning to FIG. 5, a block diagram illustrating an example of a data processing system (e.g., a computing device) in accordance with an embodiment is shown. For example, system 500 may represent any of data processing systems described above performing any of the processes or methods described above. System 500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 500 is intended to show a high-level view of many components of the computer system. However, it is to be understood that additional components may be present in certain implementations and furthermore, different arrangement of the components shown may occur in other implementations. System 500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 500 includes processor 501, memory 503, and devices 505-507 via a bus or an interconnect 510. Processor 501 may represent a single processor or multiple processors with a single processor core or multiple processor cores included therein. Processor 501 may represent one or more general-purpose processors such as a microprocessor, a central processing unit (CPU), or the like. More particularly, processor 501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 501, which may be a low power multi-core processor socket such as an ultra-low voltage processor, may act as a main processing unit and central hub for communication with the various components of the system. Such processor can be implemented as a system on chip (SoC). Processor 501 is configured to execute instructions for performing the operations discussed herein. System 500 may further include a graphics interface that communicates with optional graphics subsystem 504, which may include a display controller, a graphics processor, and/or a display device.

Processor 501 may communicate with memory 503, which in one embodiment can be implemented via multiple memory devices to provide for a given amount of system memory. Memory 503 may include one or more volatile storage (or memory) devices such as random-access memory (RAM), dynamic RAM (DRAM), synchronous DRAM (SDRAM), static RAM (SRAM), or other types of storage devices. Memory 503 may store information including sequences of instructions that are executed by processor 501, or any other device. For example, executable code and/or data of a variety of operating systems, device drivers, firmware (e.g., input output basic system or BIOS), and/or applications can be loaded in memory 503 and executed by processor 501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 500 may further include IO devices such as devices (e.g., 505, 506, 507, 508) including network interface device(s) 505, optional input device(s) 506, and other optional IO device(s) 507. Network interface device(s) 505 may include a wireless transceiver and/or a network interface card (NIC). The wireless transceiver may be a Wi-Fi transceiver, an infrared transceiver, a Bluetooth transceiver, a WiMAX transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 506 may include a mouse, a touch pad, a touch sensitive screen (which may be integrated with a display device of optional graphics subsystem 504), a pointer device such as a stylus, and/or a keyboard (e.g., physical keyboard or a virtual keyboard displayed as part of a touch sensitive screen). For example, input device(s) 506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 507 may include an audio device. An audio device may include a speaker and/or a microphone to facilitate voice-enabled functions, such as voice recognition, voice replication, digital recording, and/or telephony functions. Other IO devices 507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 510 via a sensor hub (not shown), while other devices such as a keyboard or thermal sensor may be controlled by an embedded controller (not shown), dependent upon the specific configuration or design of system 500.

To provide for persistent storage of information such as data, applications, one or more operating systems and so forth, a mass storage (not shown) may also couple to processor 501. In various embodiments, to enable a thinner and lighter system design as well as to improve system responsiveness, this mass storage may be implemented via a solid-state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also, a flash device may be coupled to processor 501, e.g., via a serial peripheral interface (SPI). This flash device may provide for non-volatile storage of system software, including a basic input/output software (BIOS) as well as other firmware of the system.

Storage device 508 may include computer-readable storage medium 509 (also known as a machine-readable storage medium or a computer-readable medium) on which is stored one or more sets of instructions or software (e.g., processing module, unit, and/or processing module/unit/logic 528) embodying any one or more of the methodologies or functions described herein. Processing module/unit/logic 528 may represent any of the components described above. Processing module/unit/logic 528 may also reside, completely or at least partially, within memory 503 and/or within processor 501 during execution thereof by system 500, memory 503 and processor 501 also constituting machine-accessible storage media. Processing module/unit/logic 528 may further be transmitted or received over a network via network interface device(s) 505.

Computer-readable storage medium 509 may also be used to store some software functionalities described above persistently. While computer-readable storage medium 509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 528, components and other features described herein can be implemented as discrete hardware components or integrated in the functionality of hardware components such as ASICS, FPGAs, DSPs or similar devices. In addition, processing module/unit/logic 528 can be implemented as firmware or functional circuitry within hardware devices. Further, processing module/unit/logic 528 can be implemented in any combination hardware devices and software components.

Note that while system 500 is illustrated with various components of a data processing system, it is not intended to represent any particular architecture or manner of interconnecting the components as such details are not germane to embodiments disclosed herein. It will also be appreciated that network computers, handheld computers, mobile phones, servers, and/or other data processing systems which have fewer components, or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for storing hibernation data for a data processing system using a storage device that uses memory of the data processing system to manage a look up table (LUT), the method comprising:
   identifying, by a hibernation manager, that a hibernation procedure for the data processing system has been initiated, the hibernation procedure ejecting the LUT from the memory and requiring that the storage device selectively cache portions of the LUT in local memory of the storage device for continued operation of the storage device during the hibernation procedure, and the LUT being of a larger size than the local memory;
   based on the identification:
   identifying, by the hibernation manager, a portion of high-performance storage space of the storage device for storage of the hibernation data used in the hibernation procedure;
   obtaining, by the hibernation manager, a compression pipeline for the hibernation data prior to storing the hibernation data in the high-performance storage to stream compressed hibernation data to the storage device for storage;
   storing, by the hibernation manager, the compressed hibernation data in the portion of the high-performance storage space using the compression pipeline; and
   initiating, by the hibernation manager, an update for a portion of the LUT cached in the local memory based on:
   logical block addresses assigned to the hibernation data by the data processing system, and
   physical addresses assigned to the hibernation data by a controller of the storage device.

2. The method of claim 1, wherein the storage device comprises:
   single level cell storage in which each cell stores a single bit of digital data, the single level cell storage hosting the high-performance storage space; and
   quad level cell storage in which each cell stores four bits of digital data.

3. The method of claim 2, wherein the portion is in a physical continuous address range of the high-performance storage space, and the physical continuous address range being defined with a starting physical address and an ending physical address.

4. The method of claim 3, wherein identifying the portion of the high-performance storage space comprises:
   making an identification that a pre-allocation for the portion was established prior to initiation of the hibernation procedure.

5. The method of claim 3, wherein identifying the portion of the high-performance storage space comprises:
   requesting that the storage device allocate some of the high-performance storage space for storage of the hibernation data.

6. The method of claim 1, wherein the portion of high-performance storage space is based on 40% of dram, and then reduced by an expected compression ratio of 25:1, and then expanded by a factor of 3 for safety.

7. The method of claim 1, wherein the portion of high-performance storage space is based on:
   a presumed size of the hibernation data, the presumed size of the hibernation data being based on a fraction of the memory of the data processing system;
   a presumed compression ratio for the hibernation data; and
   a factor of safety for the presumed compression ratio.

8. The method of claim 7, wherein the fraction of the memory of the data processing system is between 3/10 and 5/10 of the memory of the data processing system.

9. The method of claim 7, wherein the presumed compression ratio is between 1/10 and 1/25.

10. The method of claim 7, wherein the factor of safety is between 2 and 4.

11. The method of claim 1, wherein obtaining the compression pipeline comprises:
    identifying a hardware compressor available to compress the hibernation data;
    reserving use of the hardware compressor;
    establishing an input-output flow to direct the hibernation data to the hardware compressor while the hardware compressor is reserved;
    establishing a second input-output flow from the hardware compressor to the storage device while the hardware compressor is reserved; and
    streaming the hibernation data using the input-output flow and the second input-output flow to provide compressed hibernation data to the storage device.

12. A non-transitory machine-readable medium having instructions stored therein, which when executed by a processor, cause the processor to perform operations for storing hibernation data for a data processing system using a storage device that uses memory of the data processing system to manage a look up table (LUT), the operations comprising:
    identifying, by a hibernation manager, that a hibernation procedure for the data processing system has been initiated, the hibernation procedure ejecting the LUT from the memory and requiring that the storage device selectively cache portions of the LUT in local memory of the storage device for continued operation of the storage device during the hibernation procedure, and the LUT being of a larger size than the local memory;
    based on the identification:
    identifying, by the hibernation manager, a portion of high-performance storage space of the storage device for storage of the hibernation data used in the hibernation procedure;
    obtaining, by the hibernation manager, a compression pipeline for the hibernation data prior to storing the hibernation data in the high-performance storage to stream compressed hibernation data to the storage device for storage;
    storing, by the hibernation manager, the compressed hibernation data in the portion of the high-performance storage space using the compression pipeline; and initiating, by the hibernation manager, an update for a portion of the LUT cached in the local memory based on:
logical block addresses assigned to the hibernation data by the data processing system, and
physical addresses assigned to the hibernation data by a controller of the storage device.

13. The non-transitory machine-readable medium of claim 12, wherein the portion is in a physical continuous address range of the high-performance storage space, and the physical continuous address range being defined with a starting physical address and an ending physical address.

14. The non-transitory machine-readable medium of claim 12, wherein the portion of high-performance storage space is based on 40% of dram, and then reduced by an expected compression ratio of 25:1, and then expanded by a factor of 3 for safety.

15. The non-transitory machine-readable medium of claim 12, wherein the portion of high-performance storage space is based on:
a presumed size of the hibernation data, the presumed size of the hibernation data being based on a fraction of the memory of the data processing system;
a presumed compression ratio for the hibernation data; and
a factor of safety for the presumed compression ratio.

16. The non-transitory machine-readable medium of claim 12, wherein obtaining the compression pipeline comprises:
identifying a hardware compressor available to compress the hibernation data;
reserving use of the hardware compressor;
establishing an input-output flow to direct the hibernation data to the hardware compressor while the hardware compressor is reserved;
establishing a second input-output flow from the hardware compressor to the storage device while the hardware compressor is reserved; and
streaming the hibernation data using the input-output flow and the second input-output flow to provide compressed hibernation data to the storage device.

17. A data processing system, comprising:
a processor; and
a memory coupled to the processor to store instructions, which when executed by the processor, cause the processor to perform operations for storing hibernation data for a data processing system using a storage device that uses memory of the data processing system to manage a look up table (LUT), the operations comprising:
identifying, by a hibernation manager, that a hibernation procedure for the data processing system has been initiated, the hibernation procedure ejecting the LUT from the memory and requiring that the storage device selectively cache portions of the LUT in local memory of the storage device for continued operation of the storage device during the hibernation procedure, and the LUT being of a larger size than the local memory;
based on the identification:
identifying, by the hibernation manager, a portion of high-performance storage space of the storage device for storage of the hibernation data used in the hibernation procedure;
obtaining, by the hibernation manager, a compression pipeline for the hibernation data prior to storing the hibernation data in the high-performance storage to stream compressed hibernation data to the storage device for storage;
storing, by the hibernation manager, the compressed hibernation data in the portion of the high-performance storage space using the compression pipeline; and
initiating, by the hibernation manager, an update for a portion of the LUT cached in the local memory based on:
logical block addresses assigned to the hibernation data by the data processing system, and
physical addresses assigned to the hibernation data by a controller of the storage device.

18. The data processing system of claim 17, wherein the portion is in a physical continuous address range of the high-performance storage space, and the physical continuous address range being defined with a starting physical address and an ending physical address.

19. The data processing system of claim 17, wherein the portion of high-performance storage space is based on:
a presumed size of the hibernation data, the presumed size of the hibernation data being based on a fraction of the memory of the data processing system;
a presumed compression ratio for the hibernation data; and
a factor of safety for the presumed compression ratio.

20. The data processing system of claim 17, wherein obtaining the compression pipeline comprises:
identifying a hardware compressor available to compress the hibernation data;
reserving use of the hardware compressor;
establishing an input-output flow to direct the hibernation data to the hardware compressor while the hardware compressor is reserved;
establishing a second input-output flow from the hardware compressor to the storage device while the hardware compressor is reserved; and
streaming the hibernation data using the input-output flow and the second input-output flow to provide compressed hibernation data to the storage device.

* * * * *